(12) United States Patent
Lindahl et al.

(10) Patent No.: US 9,794,605 B2
(45) Date of Patent: Oct. 17, 2017

(54) USING TIME-STAMPED EVENT ENTRIES TO FACILITATE SYNCHRONIZING DATA STREAMS

(75) Inventors: Aram Lindahl, Menlo Park, CA (US); Anthony J. Guetta, Palo Alto, CA (US); Joseph M. Williams, Dallas, TX (US); Dan Timis, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1525 days.

(21) Appl. No.: 11/770,507

(22) Filed: Jun. 28, 2007

(65) Prior Publication Data

US 2009/0006488 A1    Jan. 1, 2009

(51) Int. Cl.
| | | |
|---|---|---|
| *G06F 17/00* | (2006.01) | |
| *H04N 21/242* | (2011.01) | |
| *H04N 21/43* | (2011.01) | |
| *H04N 21/442* | (2011.01) | |
| *H04N 21/8547* | (2011.01) | |

(52) U.S. Cl.
CPC ....... *H04N 21/242* (2013.01); *H04N 21/4302* (2013.01); *H04N 21/4307* (2013.01); *H04N 21/442* (2013.01); *H04N 21/8547* (2013.01)

(58) Field of Classification Search
CPC ........... H04N 21/4307; H04N 21/8547; H04N 21/4302
USPC ........................................ 715/201, 202, 203
See application file for complete search history.

(56) References Cited

U.S. PATENT DOCUMENTS

| 5,467,288 | A | * | 11/1995 | Fasciano et al. | 715/716 |
| 5,859,979 | A | * | 1/1999 | Tung et al. | 709/228 |
| 6,023,233 | A | * | 2/2000 | Craven | H03M 7/30 341/51 |
| 6,122,668 | A | * | 9/2000 | Teng et al. | 709/231 |
| 6,337,636 | B1 | * | 1/2002 | Page et al. | 340/870.13 |
| 6,505,160 | B1 | * | 1/2003 | Levy | G06F 17/30017 455/3.06 |
| 6,642,966 | B1 | * | 11/2003 | Limaye | 348/473 |

(Continued)

FOREIGN PATENT DOCUMENTS

WO    WO 2006/115606    * 11/2006    ............... H04N 7/58

OTHER PUBLICATIONS

Parr et al., A Paradigm Shift in the Distribution of Multimedia, ACM 2000, pp. 103-109.*

(Continued)

*Primary Examiner* — Cong-Lac Huynh
(74) *Attorney, Agent, or Firm* — Baker Hostetler LLP; Robert L. Hails

(57) ABSTRACT

An embodiment of a system to synchronize data streams is described. During operation, the system receives a first data stream having a first data type and performs a sequence of operations on at least a portion of the first data stream. Next, the system stores metadata associated with the first data stream one or more times during the sequence of operations. Metadata can include a time stamp, data-stream information associated with the portion of the first data stream, and event information associated with the occurrence of one or more events during the sequence of operations. Moreover, the system provides a notification based on the stored metadata, the notification to facilitate synchronizing the first data stream with a second data stream having a second data type.

26 Claims, 8 Drawing Sheets

(56) References Cited

U.S. PATENT DOCUMENTS

| | | | |
|---|---|---|---|
| 6,877,134 B1* | 4/2005 | Fuller et al. | 715/202 |
| 7,024,575 B2* | 4/2006 | Lienhart et al. | 713/400 |
| 7,194,676 B2* | 3/2007 | Fayan et al. | 715/203 |
| 7,428,696 B2* | 9/2008 | Shin | 715/203 |
| 7,434,154 B2* | 10/2008 | Konetski | 715/203 |
| 7,627,811 B2* | 12/2009 | Thong et al. | 715/203 |
| 7,664,057 B1* | 2/2010 | Wu et al. | 370/260 |
| 7,881,582 B2* | 2/2011 | Cragun et al. | 386/343 |
| 7,900,140 B2* | 3/2011 | Mohammed et al. | 715/249 |
| 8,189,690 B2* | 5/2012 | Whitaker | H04N 21/4307 348/143 |
| 8,230,094 B1* | 7/2012 | Frankel | H04L 65/604 709/219 |
| 8,363,161 B2* | 1/2013 | Pearlstein | H04N 21/2368 348/515 |
| 8,849,432 B2* | 9/2014 | Moorer | H04N 21/4223 700/94 |
| 8,887,048 B2* | 11/2014 | Nordhagen | G06F 17/30038 715/716 |
| 8,973,063 B2* | 3/2015 | Spilo | H04N 5/76 725/78 |
| 8,982,943 B2* | 3/2015 | Katayama | H04N 5/04 375/240.01 |
| 8,995,536 B2* | 3/2015 | Subramanian | H04N 21/44004 375/240.25 |
| 9,071,746 B2* | 6/2015 | Allen | H04N 1/00127 |
| 9,083,854 B2* | 7/2015 | Pack | H04N 7/17318 |
| 9,083,994 B2* | 7/2015 | Cheng | G10L 19/005 |
| 9,167,220 B2* | 10/2015 | Johnson | G11B 27/10 |
| 9,271,028 B2* | 2/2016 | Schmidt | H04N 21/234318 |
| 9,288,554 B2* | 3/2016 | Lee | H04N 7/08 |
| 9,420,332 B2* | 8/2016 | Abrol | G10L 21/01 |
| 9,456,243 B1* | 9/2016 | Hughes | H04N 21/44016 |
| 2002/0018143 A1* | 2/2002 | Tarnoff et al. | 348/441 |
| 2003/0135822 A1* | 7/2003 | Evans | 715/500.1 |
| 2004/0001693 A1* | 1/2004 | Cavallerano et al. | 386/68 |
| 2004/0032916 A1* | 2/2004 | Takashima | H04J 3/0632 375/340 |
| 2004/0034655 A1* | 2/2004 | Tecu | G10L 19/02 |
| 2004/0205478 A1* | 10/2004 | Lin et al. | 715/500.1 |
| 2004/0267952 A1* | 12/2004 | He | H04L 29/06027 709/231 |
| 2005/0076390 A1* | 4/2005 | Klausberger et al. | 725/134 |
| 2005/0091571 A1* | 4/2005 | Leichtling | 715/500 |
| 2005/0187943 A1* | 8/2005 | Finke-Anlauff | G06F 17/30064 |
| 2005/0190872 A1* | 9/2005 | Seong et al. | 375/354 |
| 2006/0004787 A1* | 1/2006 | Borthakur | G06F 17/30067 |
| 2006/0047722 A1* | 3/2006 | Walker et al. | 707/204 |
| 2006/0047967 A1* | 3/2006 | Akhan et al. | 713/176 |
| 2006/0064716 A1* | 3/2006 | Sull | G06F 17/30793 725/37 |
| 2006/0107195 A1* | 5/2006 | Ramaswamy | G06Q 30/02 715/203 |
| 2006/0117370 A1* | 6/2006 | Kitazato et al. | 725/116 |
| 2006/0190968 A1* | 8/2006 | Jung et al. | 725/74 |
| 2006/0200743 A1* | 9/2006 | Thong et al. | 715/500.1 |
| 2006/0233247 A1* | 10/2006 | Visharam | G11B 27/3027 375/240.12 |
| 2006/0291798 A1* | 12/2006 | Suneya | G11B 27/034 386/232 |
| 2007/0044010 A1* | 2/2007 | Sull et al. | 715/500.1 |
| 2007/0067707 A1* | 3/2007 | Travis et al. | 715/500.1 |
| 2007/0081562 A1* | 4/2007 | Ma | 370/516 |
| 2007/0186235 A1* | 8/2007 | Jarman et al. | 725/28 |
| 2007/0225997 A1* | 9/2007 | Haberman et al. | 705/1 |
| 2007/0276670 A1* | 11/2007 | Pearlstein | H04N 21/2368 704/270 |
| 2007/0288971 A1* | 12/2007 | Cragun et al. | 725/90 |
| 2008/0037954 A1* | 2/2008 | Lee et al. | 386/96 |
| 2008/0086754 A1* | 4/2008 | Chen et al. | 725/105 |
| 2008/0126109 A1* | 5/2008 | Cragun et al. | 705/1 |
| 2008/0126387 A1* | 5/2008 | Blinnikka | 707/102 |
| 2008/0195744 A1* | 8/2008 | Bowra | H04L 65/80 709/231 |
| 2008/0222300 A1* | 9/2008 | Bouazizi | 709/231 |
| 2008/0244373 A1* | 10/2008 | Morris et al. | 715/202 |
| 2008/0263612 A1* | 10/2008 | Cooper | 725/116 |
| 2009/0006488 A1* | 1/2009 | Lindahl et al. | H04N 21/242 |
| 2009/0087166 A1* | 4/2009 | Kanemaru et al. | 386/109 |
| 2009/0106031 A1* | 4/2009 | Jax | G10L 19/24 704/500 |
| 2009/0109339 A1* | 4/2009 | Ackley et al. | 348/565 |
| 2009/0172457 A1* | 7/2009 | Gnanasambandam et al. | 713/600 |
| 2009/0235364 A1* | 9/2009 | Cohen et al. | 726/28 |
| 2011/0035034 A1* | 2/2011 | Gupta et al. | 700/94 |
| 2011/0238747 A1* | 9/2011 | Yu | G06Q 30/0242 709/203 |
| 2011/0314095 A1* | 12/2011 | Gupta | H04N 21/23412 709/203 |
| 2013/0301831 A1* | 11/2013 | Sato | H04N 5/783 380/236 |
| 2015/0154231 A1* | 6/2015 | Rodriguez et al. | G06F 17/30265 382/100 |
| 2015/0215060 A1* | 7/2015 | Zou | H04J 3/1658 398/98 |
| 2016/0360248 A1* | 12/2016 | Emura | H04N 21/242 |

OTHER PUBLICATIONS

Picard et al., A Corba Based Platform as Communication Support for Synchronous Collaborative Virtual Environment, ACM 2001, pp. 56-59.*

Cutler et al., Distributed Meetings: A Meeting Capture and Broadcasting System, ACM 2002, pp. 503-512.*

Sack et al., Automated Annotation of Synchronized Multimedia Presentations, Google 2006, pp. 1-10.*

Einhorn et al., A Metadata Model for Capturing Presentations, IEEE 2003, pp. 110-114.*

Mu et al., Enriched Video Semantic Metadata: Authorization, Integration, and Presentation, Google 2003, pp. 1-8.*

Nack et al., Everything You Wanted to Know about MPEG-7: Part 1, IEEE 1999, pp. 65-77.*

Beek et al., Metadata-driven Multimedia Access, IEEE 2003, pp. 40-52.*

Radhakrishnan et al. Audio and Video Signatures for Synchronization, IEEE 2008, pp. 1549-1552.*

Nack et al., Everything You Want to Know about MPEG-7: Part 1, IEEE 1999, pp. 65-77.*

Guler, Scene and Content Analysis from Multiple Video Streams, IEEE 2001, pp. 119-125.*

Lin et al., A Timestamp-sensitive Scheduling Algorithm for MPEP-II Multiplexers in CATV Networks, IEEE 1998, pp. 336-345.*

* cited by examiner

USING TIME-STAMPED EVENT ENTRIES TO FACILITATE SYNCHRONIZING DATA STREAMS

BACKGROUND

Field of the Invention

The present invention relates to techniques for synchronizing data streams. More specifically, the present invention relates to circuits and methods for storing information associated with events while processing data streams and using the stored information to synchronize the data streams.

Related Art

Rapid advances in computing power and network bandwidth have enabled computer systems to easily manipulate various types of encoded media, such as encoded video files and encoded audio files. The process of playing back of encoded media often involves decoding different types of media, such as video images and associated audio. However, these different types of media are typically encoded in different formats. Consequently, decoding of encoded media often involves coordinating the decoding of separate data streams associated with the different types of media.

The task of coordinating separate data streams as they are processed in different decoders can be a challenge, especially as operating conditions and user requirements vary dynamically. Existing techniques attempt to coordinate different data streams by estimating when events occur or will occur during processing of the data streams. However, these estimates are often inaccurate, which can cause delays in providing decoded data to the user or can cause a glitch during playback that degrades the quality of the user experience.

Hence what is needed is a method and an apparatus that facilitates synchronizing data streams without the above-described problems.

SUMMARY

Embodiments of a system that synchronizes multiple data streams (such as a video data stream and an associated audio data stream) are described. In particular, the system may store metadata multiple times as these data streams are processed. For example, the metadata may be stored as a given data stream is processed in a data pipeline, such as a decoder. Note that the metadata may be associated with data in at least a portion of the given data stream and may include: timestamps, one or more memory addresses associated with this portion of the data, and/or one or more events (such as when the data is decoded). Moreover, control logic or software in the system may use at least some of the stored metadata to improve the synchronization, thereby reducing or eliminating delays and/or glitches associated with timing mismatches between the data streams.

Another embodiment of the present invention provides the system that synchronizes data streams. During operation, the system receives a first data stream having a first data type and performs a sequence of operations on at least a portion of the first data stream. Next, the system stores metadata associated with the first data stream one or more times during the sequence of operations. Note that a given metadata entry includes a time stamp, data-stream information associated with the portion of the first data stream, and event information associated with the occurrence of one or more events during the sequence of operations. Moreover, the system provides a notification based on the stored metadata, the notification to facilitate synchronizing the first data stream with a second data stream having a second data type.

In some embodiments, the first data stream includes initial metadata. Moreover, the first data stream may include a first type of media and the second data stream may include a second type of media. For example, the first data stream may include audio and the second data stream may include video corresponding to the audio.

In some embodiments, the sequence of operations includes decoding of audio data. Moreover, in some embodiments, the stored metadata indicates where the portion of the first data stream is located with reference to the sequence of operations.

In some embodiments, the system phase shifts the notification by a time interval, where the phase shift can be positive or negative.

In some embodiments, the data-stream information associated with the portion of the first data stream includes an address in a memory.

In some embodiments, the system evaluates multiple events in the stored metadata using pre-defined rules and generates the notification.

In some embodiments, the notification is provided based on a resizing of a memory allocation associated with at least one operation in the sequence of operations. Moreover, in some embodiments the notification is provided based on a presence of a given event in a subset of the one or more events in the stored metadata.

In some embodiments, the one or more events include: when the portion of the first data is consumed at an output at the end of the sequence of operations; completion of a given operation in the sequence of operations; completion of the sequence of operations; detection of an end of the first data stream; a time-scale modification affecting at least one operation in the sequence of operations; changing an active audio-output device; an error associated with the first data or at least one operation in the sequence of operations; an internal event associated with at least one operation in the sequence of operations or an external event associated with an application that consumes processed first data output from the sequence of operations; and/or a change in current media playback time. For example, the change may include: fast forwarding, rewinding and/or seeking.

In another embodiment of the system, the system provides the first data stream and the second data stream, and executes at least one event with respect to the first data stream. Next, the system provides a metadata entry for each event and uses the metadata entry to synchronize the first data stream with the second data stream.

Another embodiment provides a computer program product for use in conjunction with the system. This computer program product may include instructions corresponding to at least some of the above-described operations. Moreover, these instructions may include high-level code in a program module and/or low-level code that is executed by a processor in the system.

Another embodiment provides a method for synchronizing data streams. This method may perform at least some of the above-described operations.

Another embodiment provides one or more integrated circuits, which may be included in the system. During operation of the one or more integrated circuits, an input interface receives the first data stream having the first data type. Next, an operation circuit, which is electrically coupled to the input interface, receives at least a portion of the first data stream and performs the sequence of operations on at least the portion of the first data stream. Then, an event circuit, which is electrically coupled to the operation circuit and a memory buffer, stores the metadata associated with at least the portion of the first data stream in the memory buffer one or more times during the sequence of operations. Moreover, a notification circuit (which is electrically coupled to the memory buffer) provides the notification based on the stored metadata, and an output interface (which is electrically coupled to the operation circuit and the notification circuit) provides processed data output by the operation circuit and the notification.

Another embodiment provides another integrated circuit, which may be included in the system. During operation of this integrated circuit, control logic stores the metadata associated with the first data stream in the memory while the sequence of operations is performed on at least a portion of the first data stream. Note that the metadata is stored one or more times during the sequence of operations, and the metadata includes temporal event information associated with the occurrence of one or more events during the sequence of operations which facilitates synchronizing the first data stream with the second data stream.

Another embodiment provides a portable device. This portable device may include one or more of the above-described integrated circuits and/or may execute instructions corresponding to at least some of the above-described operations. In some embodiments, the portable device includes a touch-sensitive display which is configured to determine movement of one or more points of contact by a user of the touch-sensitive display.

BRIEF DESCRIPTION OF THE FIGURES

Note that like reference numerals refer to corresponding parts throughout the drawings.

DETAILED DESCRIPTION

Figure 1:
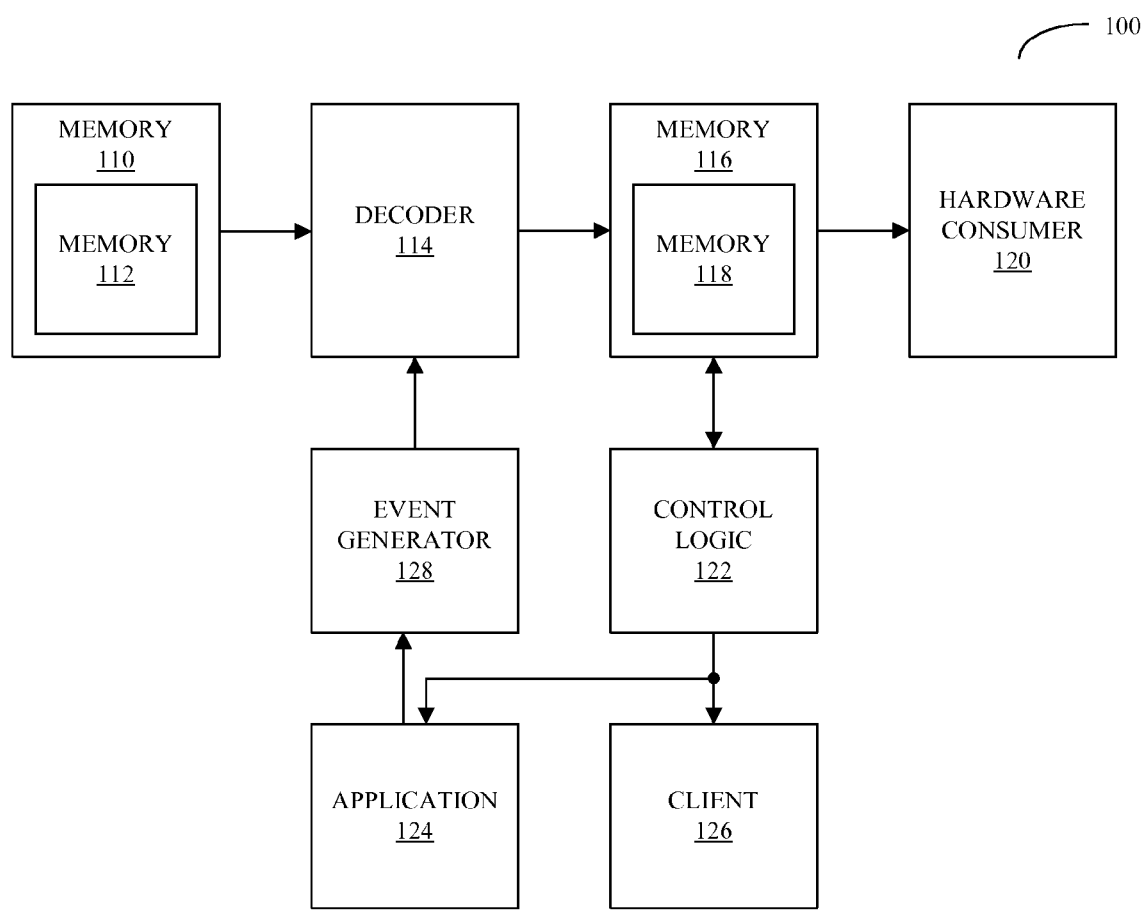
FIG. 1 is a block diagram illustrating a circuit in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of hardware, software, and/or processes for using the hardware and/or software are described. Note that hardware may include a circuit, a device (such as a portable device), and/or a system (such as a computer system), and software may include a computer program product for use with the computer system. Moreover, in some embodiments the portable device and/or the system include one or more of the circuits (for example, in one or more integrated circuits).

These circuits, devices, systems, computer program products, and/or processes may be used to synchronize multiple data streams (such as a video data stream and an associated audio data stream). In particular, metadata may be stored multiple times as these data streams are processed. For example, the metadata may be stored as a given data stream is processed in a data pipeline, such as a decoder. Note that the metadata may be associated with data in at least a portion of the given data stream and may include: timestamps, one or more memory addresses associated with this portion of the data, and/or one or more events (such as when the data is decoded).

Moreover, control logic or software in a device and/or a system may use at least some of the stored metadata to improve the synchronization, thereby reducing or eliminating delays and/or glitches associated with timing mismatches between the data streams. For example, if a video data is decoded before an associated audio data stream, the device and/or system may flash a displayed video image while waiting for the audio data stream. By reducing or eliminating the delays and/or glitches, these techniques may improve the quality of a user experience when using the device and/or system.

These techniques may be used in a wide variety of devices and/or systems. For example, the device and/or the system may include: a personal computer, a laptop computer, a cellular telephone, a personal digital assistant, an MP3 player, a portable television, an iPod (a trademark of Apple, Inc.), an iPhone, and/or a device that plays back one or more types of media.

Circuits that synchronize data streams in a device and/or a system in accordance with embodiments of the invention are now described. In the embodiments that follow, the technique is used to synchronize a video data stream with an associated audio data stream (which includes audio data, such as one or more audio files) as the video data stream is processed in a video decoder pipeline and the audio data stream is processed in an audio decoder pipeline. In other embodiments the technique is applied to synchronize data streams including different types of media which are processed in another decoder pipeline. In general, these techniques may be applied to an arbitrary type of data in a given data stream and/or during an arbitrary data pipeline or sequence of operations. For example, the techniques may be used to synchronize data streams associated with encryption and/or decryption of data. Note that the one or more circuits may be included on one or more integrated circuits, and that the one or more integrated circuits may be included in the device and/or the system.

FIG. 1 presents a block diagram illustrating an embodiment of a circuit 100. Decoder 114 in this circuit may receive encoded data from memory 110 (such as a buffer) and may provide decoded data to memory 116. In an exemplary embodiment, the encoded data includes encoded audio data, which may be associated with a file (e.g., a song or an album). This audio data may be compatible with a variety of encoding or file formats, including: Advance Audio Coding (AAC), High Efficiency Advance Audio Coding (HE-AAC), an MPEG standard (such as MP3), Algebraic Code Excited Linear Prediction (ACELP), Apple Lossless Audio Codec (ALAC), Wave (WAV), Audio Interchange File Format (AIFF), Adaptive Multi-Rate (AMR), an Interactive Media Association (IMA) standard, and/or a QDesign Music Codec, as well as other encoding or file formats. However, note that the circuit 100 may be used to decode a variety of types of media, such as video and/or encrypted data.

Decoder 114 may use a portion of memory 110 (such as memory 112) during the receiving of the encoded data and/or a portion of memory 116 (such as memory 118) during the decoding of the encoded data. For example, memory 112 and/or memory 118 may be used as temporary memory during the decoding. In some embodiments, memory 112 includes a different type of memory than memory 110, and memory 118 includes a different type of memory than memory 116. For example, memory 112 and/or 118 may be SRAM and memory 110 and/or 116 may be DRAM. However, a wide variety of types of memory may be used for these components in the circuit 100, including: DRAM, SRAM, FLASH, solid-state memory, volatile memory, and/or non-volatile memory. Moreover, some or all of memory 110, 112, 116, and/or 118 may be separate components or integrated with one another into a single component.

Memory 116 may store the decoded data until it is consumed by hardware consumer 120 (such as one or more audio circuits and speakers) on behalf of a media playback application or software that executes in the device and/or the system which includes the circuit 100. When the decoded data is consumed (e.g., the decoded data is output to the hardware consumer 120), the consumed decoded data may be removed from the memory 116. Alternatively, consumed decoded data is no longer needed in the memory 116 and may be subsequently overwritten or erased.

In general, a rate of processing the encoded data in the circuit 100 may vary based on user commands and dynamic operation of the device and/or the system. For example, a user may instruct a playback application or software to perform a seek operation, which may move a pointer within a given file or to another file. Moreover, the user may perform a time-scale modification operation when post processing decoded data. Consequently, the decoder 114 may be reset as the encoded data to be decoded is changed. However, these dynamic modifications make it difficult to estimate or predict when encoded data associated with the new pointer location is processed and output to the memory 116. Thus, during operation of the device and/or system it may be difficult to coordinate or synchronize a data stream that includes decoded data output to the hardware consumer 120 with another data stream that includes another type of decoded data (such as video data) associated with another data pipeline.

One approach to reduce or eliminate synchronization errors associated with the different data streams is to store metadata. In particular, as a given data stream is processed in the circuit 100, metadata associated with at least a portion of the data in the given data stream may be stored when different events occur. This metadata may be used by control logic 122 to synchronize the data stream with one or more additional data streams.

As illustrated in FIG. 1, when an event occurs, event generator 128 may add metadata (including one or more event tokens) to the decoded data (or the data being decoded). This metadata may be stored in memory 116 and/or 118. In general, such metadata may be stored one or more times as a sequence of operations is performed on a data stream traversing the circuit 100. Control logic 122 may use this metadata to provide one or more notifications (such as synchronization commands) to an application 124 (such as a media playback application) and/or a client 126 which is associated with consumption of the decoded data by the hardware consumer 120. For example, the control logic 122 may initiate or queue additional operations based on the stored metadata, the time stamps, and/or when the decoded data in the memory 116 is consumed. Alternatively, a video signal may be resynchronized based on the one or more notifications, thereby preventing video from being displayed prematurely (relative to an associated audio data stream). Consequently, these notifications may facilitate improved synchronization of an output data stream of decoded data from the memory 116 (such as decoded audio data) with another data stream (such as decoded video data).

In some embodiments, a given metadata entry includes a time stamp, data-stream information associated with the portion of the data stream (such as one or more memory addresses where data associated with operations in the sequence of operations is stored), and event information associated with the occurrence of one or more events during the sequence of operations. Moreover, in some embodiments the stored metadata indicates where the portion of the data stream is in the sequence of operations. In general, the metadata may include temporal event information associated with the occurrence of one or more events during the sequence of operations which facilitates synchronizing the data stream with another data stream.

A wide variety of events during the decoding (or more generally, the sequence of operations) may result in metadata being stored. For example, the one or more events may include: completion of a given operation during the decoding, completion of the decoding of encoded data, and/or when decoded data is consumed from the memory 116. Moreover, an event may be associated with a time-scale modification affecting at least one operation during the decoding. This time-scale modification may change a current media playback time, such as a trick mode (for example, fast forward, rewind, seeking, 2×, and/or pause).

In some embodiments, changing an active audio-output device associated with the hardware consumer 120 constitutes an event and results in metadata being stored. For example, such a device change may include: stopping audio playback, switching the device, restarting the audio playback, and notifying the device and/or the system of the change.

Other device changes may include resizing of a display and/or the occurrence of an error. For example, an error associated with an operation during the decoding may constitute an event and may result in metadata being stored. In general, the events (and thus the metadata) may include one or more internal events associated with at least one operation during the decoding or one or more external events associated with the hardware consumer 120, the application 124, and/or the client 126, which consume decoded data from the memory 116.

As described below with reference to FIGS. 3A and 3B, control logic 122 may evaluate multiple events in the stored metadata. In some embodiments, this analysis is based on pre-defined rules, which prioritize the different events and determine the appropriate notification(s) to generate. For example, some events, such as a time-scale modification or a resizing of an amount of memory allocated to the decoded data, may have a greater impact on synchronizing different data streams in the device and/or the system. Consequently, if one of these events is present in the metadata, the notification(s) may be based on these events. However, in other embodiments control logic 122 may interpolate between the time stamps in the metadata to determine how to synchronize the different data streams using the one or more notifications.

In this way, the metadata allows the control logic 122 to determine latency associated with operation of the circuit 100 (and, more generally, with the sequence of operations associated with the decoding). Moreover, this synchronization technique is able to account for, and thus to include, the impact of generalized events which occur internally or externally to the circuit 100 but which impact the latency associated with the decoding. Consequently, by storing metadata associated with the one or more events and subsequently generating notifications or synchronization commands based on one or more of the events in the stored metadata, the circuit 100 may be used to reduce or eliminate synchronization errors between different data streams.

Note that in some embodiments the circuit 100 includes fewer or additional components. Moreover, two or more components can be combined into a single component and/or a position of one or more components can be changed. In some embodiments, some or all of the functions illustrated in the circuit 100 are implemented in software.

Figure 2A:
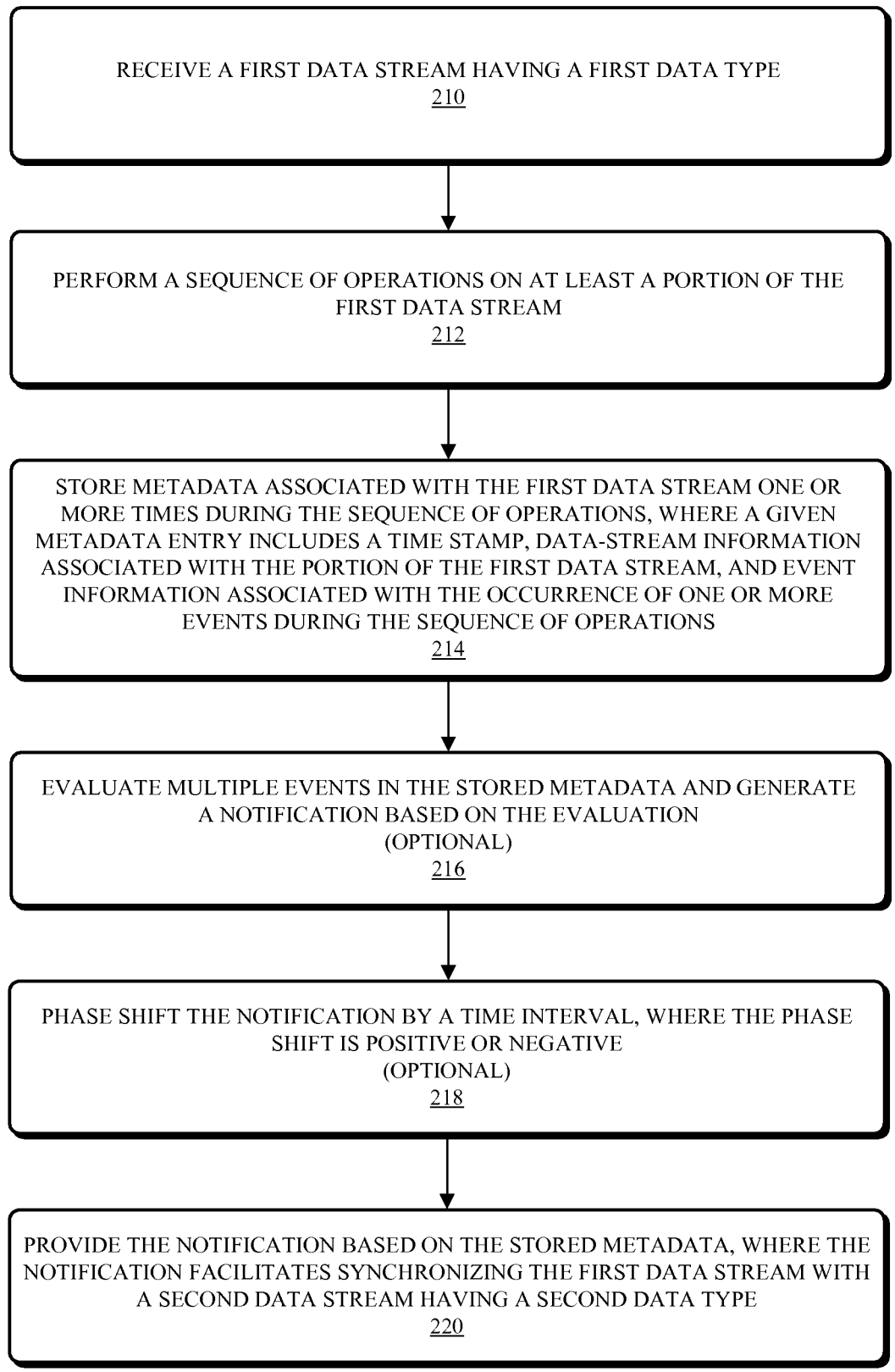
FIG. 2A is a flowchart illustrating a process for synchronizing data streams in accordance with an embodiment of the present invention.

Processes for synchronizing data streams, which may be performed by a device and/or a system, in accordance with embodiments of the invention are now described. FIG. 2A presents a flowchart illustrating an embodiment of a process 200 for synchronizing data streams, which may be performed by the device and/or the system. During operation, the system receives a first data stream having a first data type (210) and performs a sequence of operations on at least a portion of the first data stream (212). Next, the system stores metadata associated with the first data stream one or more times during the sequence of operations (214). Note that a given metadata entry includes a time stamp, data-stream information associated with the portion of the first data stream, and event information associated with the occurrence of one or more events during the sequence of operations.

In some embodiments, the system optionally evaluates multiple events in the stored metadata and generates a notification based on the evaluation (216). Moreover, the system may phase shift the notification by a time interval (218), where the phase shift is positive or negative. Then, the system provides the notification based on the stored metadata (220), where the notification facilitates synchronizing the first data stream with a second data stream having a second data type, where the notification facilitates synchronizing the first data stream with a second data stream having a second data type.

In an exemplary embodiment, the first data stream includes encoded audio data and the sequence of operations includes decoding of this data. As the encoded data is decoded, metadata is stored. This metadata may include information about events, such as completion of a portion of the decoding or a change to a playback speed (such as when a user seeks through an audio file). Moreover, this metadata may be analyzed to estimate when the decoding will be completed, and to generate one or more notifications that are used to synchronize a stream of decoded data with another stream, such as one that includes decoded video.

Figure 2B:
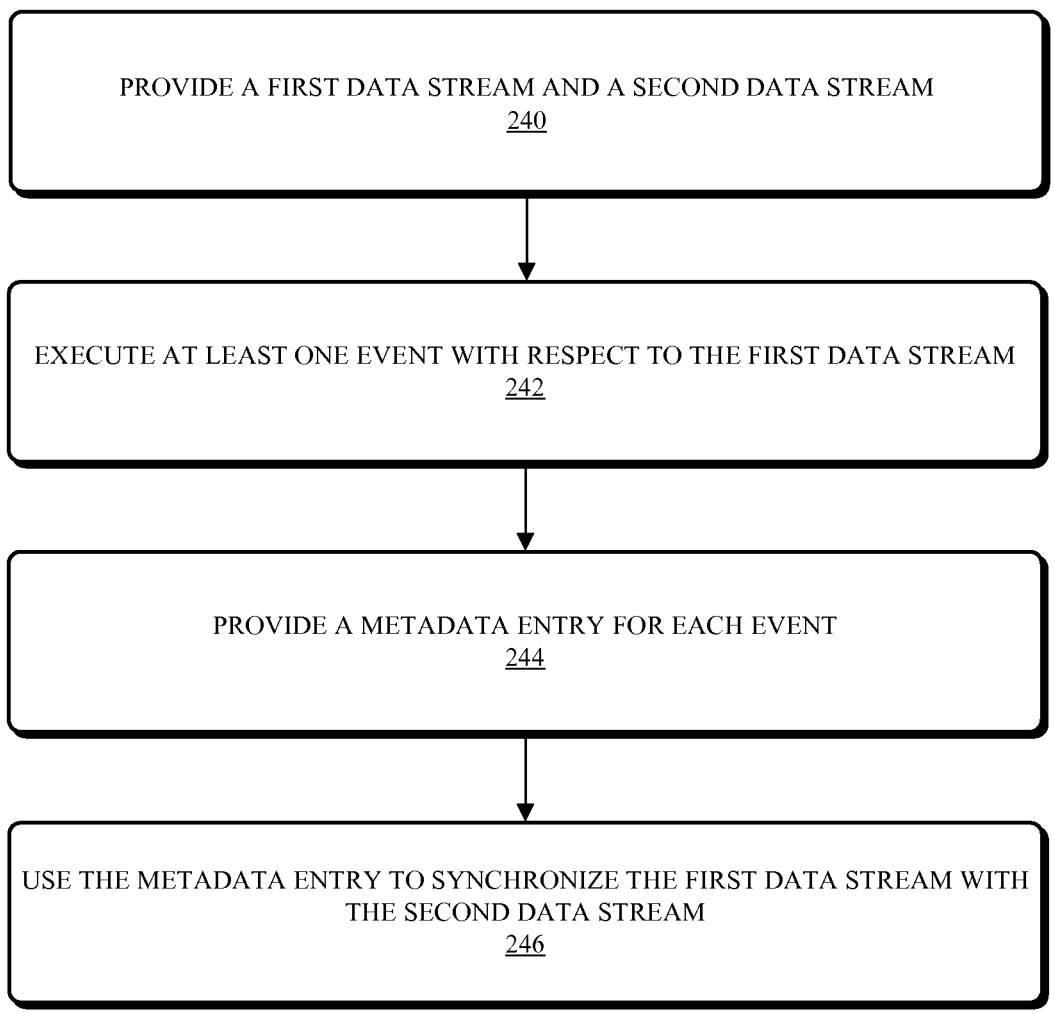
FIG. 2B is a flowchart illustrating a process for synchronizing data streams in accordance with an embodiment of the present invention.

FIG. 2B presents a flowchart illustrating an embodiment of a process 230 for synchronizing data streams, which may be performed by the device and/or the system. During operation, the system provides a first data stream and a second data stream (240), and executes at least one event with respect to the first data stream (242). Next, the system provides a metadata entry for each event (244) and uses the metadata entry to synchronize the first data stream with the second data stream (246).

Figure 3A:
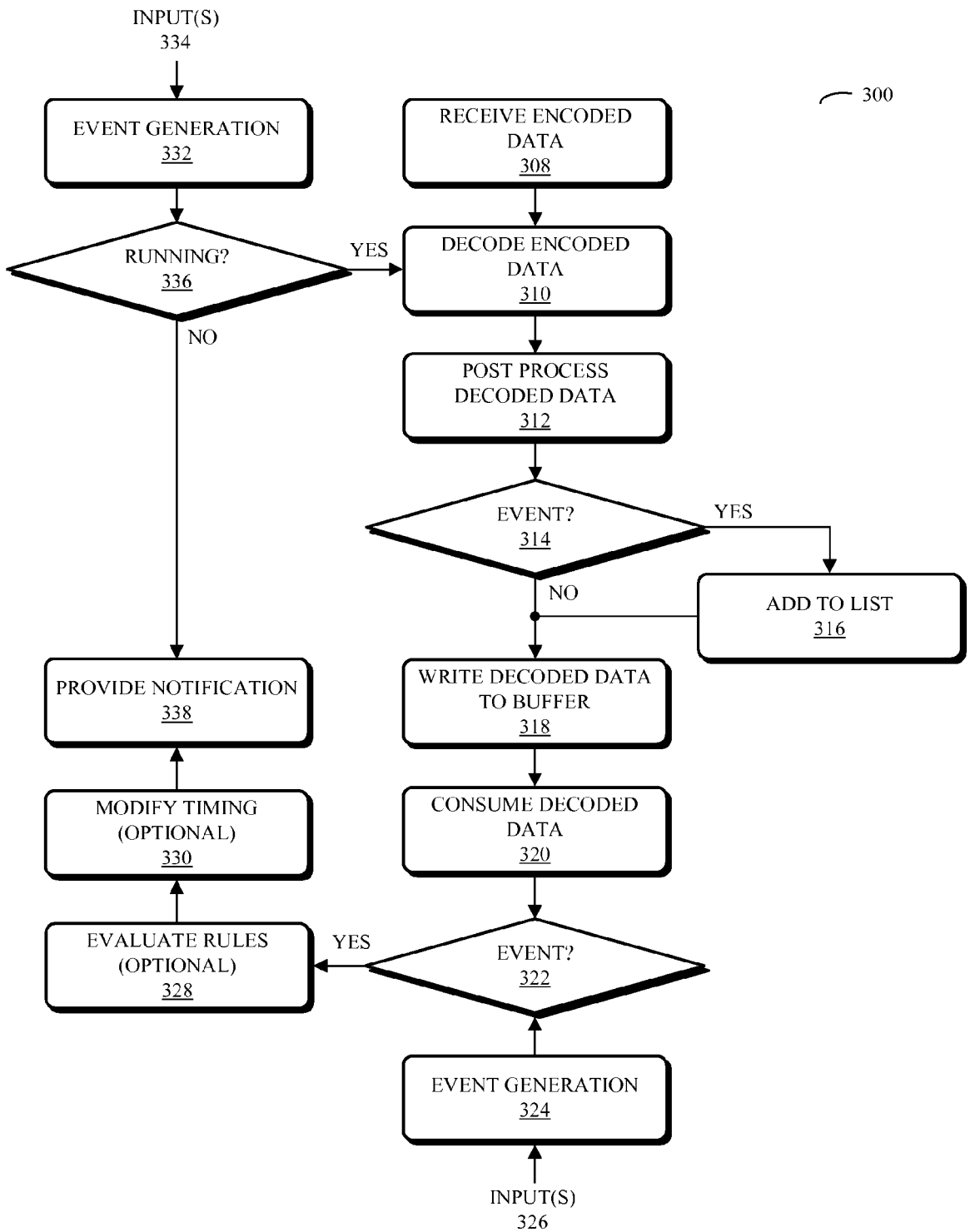
FIG. 3A is a flowchart illustrating a process for synchronizing data streams in accordance with an embodiment of the present invention.
Figure 3B:
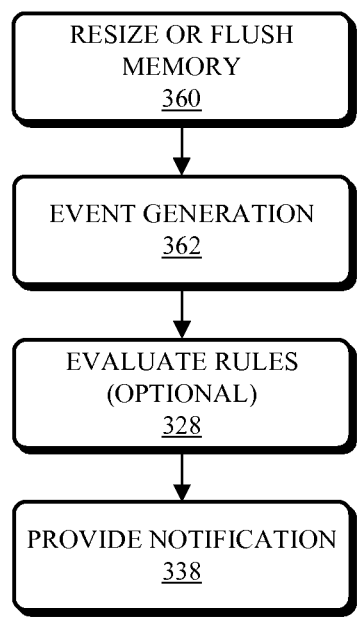
FIG. 3B is a flowchart illustrating a process for synchronizing data streams in accordance with an embodiment of the present invention.

FIG. 3A presents a flowchart illustrating an embodiment of a process 300 for synchronizing data streams, which may be implemented by the device and/or the system. During operation, the system receives encoded data (308) and decodes the encoded data (310). Note that this encoded data may include initial metadata, such as a time stamp that is included in a file format and/or an event token (such as an end-of-file marker). Moreover, based on one or more inputs 334, the system may generate additional metadata such as event (332) token corresponding to an event (such as the occurrence of one of the inputs 334). In an exemplary embodiment, the one or more inputs 334 include: a timescale modification (such as during post processing of decoded audio data), an effects change (such as equalization), a resume command (following a previous pause command), and/or a time (which may indicate that a user interface is to perform an operation a pre-defined time prior to outputting the decoded data).

If the system is currently running (336) or performing a sequence of operations (for example, the system is currently consuming decoded data generated during the process 300), the additional metadata may be added to the decoded data. As discussed further below, if the system is not currently running (336) (for example, the user has paused consumption of decoded data), the system may store the additional metadata in a stored list of metadata (not shown) and/or may provide one or more notifications (338) based on the stored metadata. This notification(s) may be used to synchronize different data streams.

Next, the system may post process the decoded data (312). This post processing may include equalization and/or certain trick modes (such as jumps). Then, the system may determine if one or more event tokens associated with the initial metadata and/or additional metadata are included in the decoded data stream (314). If yes, the initial metadata and/or the additional metadata are added to the stored list (316) of metadata associated with at least a portion of the decoded data. However, whether or not the one or more event tokens associated with the initial metadata and/or the additional metadata are detected (314), the decoded data is written to a buffer (318). Note that the time stamp(s) in the initial and/or additional metadata may be updated as the data progresses through the process 300, when the metadata in the stored list is updated (316), and/or when decoded data is consumed. Moreover, note that additional entries to the stored metadata may be appended to the end of the stored list and/or may be interleaved between existing entries in the stored metadata.

Subsequently, the decoded data may be consumed from the buffer (320). Based on one or more inputs 326 (which may occur prior, during, or after the decoded data is consumed), the system may generate additional metadata such as another event (324) token. For example, the one or more inputs 326 may include: an end of the decoding, changing the device that is consuming the decoded data, and/or an error (such as a decoder error or a read error while filling encoded data into the memory 110 in FIG. 1).

Next, if the one or more event tokens associated with the additional metadata are detected (322), the additional metadata may be added to the stored list (not shown) of metadata associated with at least a portion of the decoded data. Moreover, the various stored event tokens may be optionally evaluated (328) based on one or more pre-defined rules. For example, these rules may prioritize the various events to determine a type of one or more notification to provide (338). Note that in some embodiments the one or more notifications may be time shifted earlier or later by optionally modifying timing (330). This time shifting may allow interpolation of the timing of the one or more notifications, such as when the decoded data is being rapidly consumed.

Modifications to the memory 110 (FIG. 1), 112 (FIG. 1), 116 (FIG. 1), and/or 118 (FIG. 1) may also constitute an event. For example, an amount of memory allocated to decoded data may be changed based on a sampling rate or a sample size of the data, or decoded data in memory may be flushed during a seek operation. However, such events may be handled in a separate (but related) process from the process 300. This is shown in FIG. 3B, which presents a flowchart illustrating an embodiment of a process 350 for synchronizing data streams, which may be implemented by the device and/or the system.

During operation, the system may detect a resizing or flushing of data (360) from a memory associated with the circuit 100 (FIG. 1) and additional metadata (including an event token) may be generated (362) and added to the stored list of metadata (not shown). Next, the system may optionally evaluate one or more of the stored event tokens based on the one or more pre-defined rules (328) (for example, a latency may be determined following the changing the allocated memory) and may provide the notification (338).

Note that in some embodiments of the processes 200 (FIG. 2A), 230 (FIG. 2B), 300 (FIG. 3A), and/or 350 there may be additional or fewer operations, the order of the operations may be changed, and two or more operations may be combined into a single operation.

Figure 4:
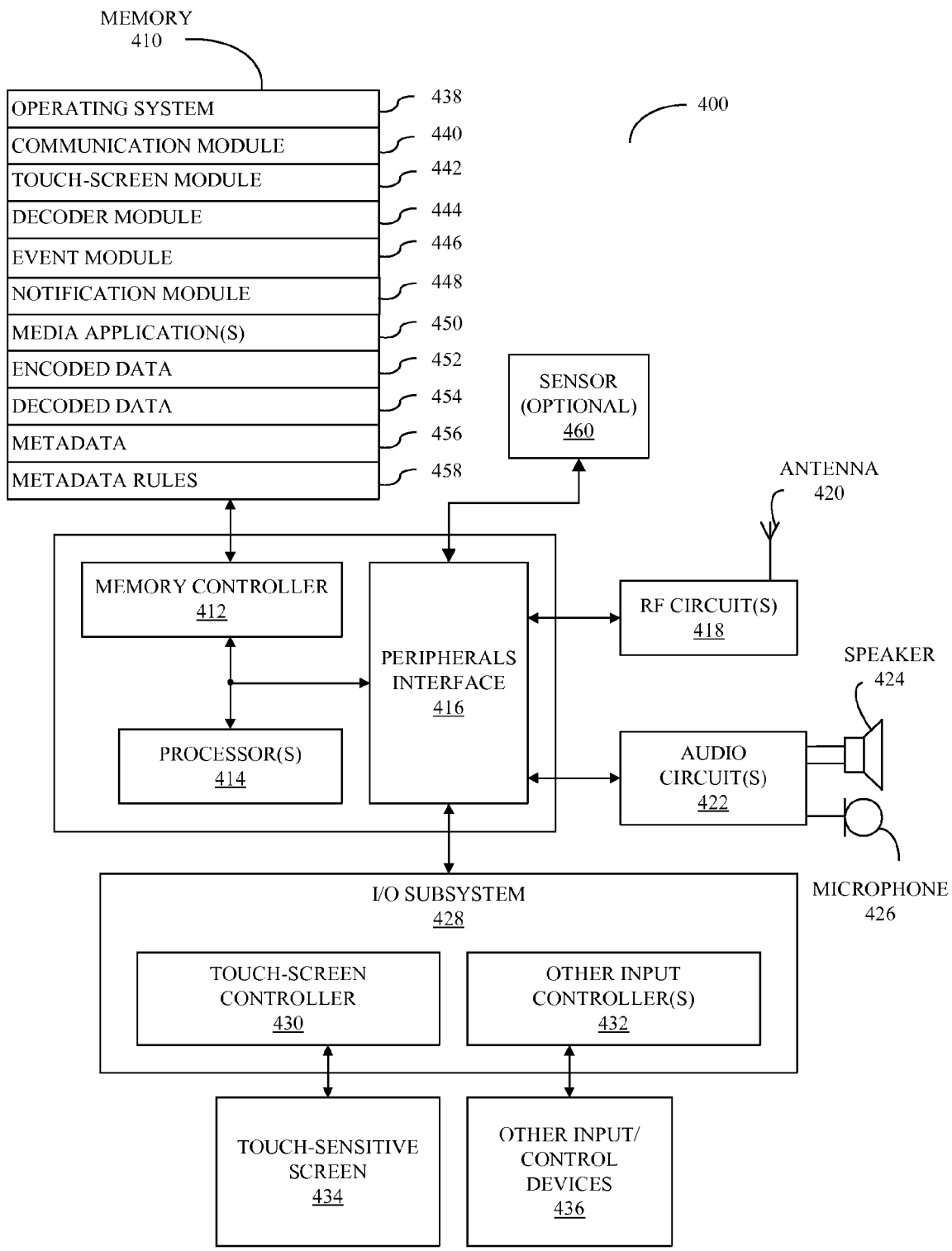
FIG. 4 is a block diagram illustrating a portable device in accordance with an embodiment of the present invention.

Devices and computer systems for implementing these synchronization techniques in accordance with embodiments of the invention are now described. FIG. 4 presents a block diagram illustrating an embodiment of a portable device 400, which may include a touch-sensitive screen 434. This device may include a memory controller 412, one or more data processors, image processors and/or central processing units 414, and a peripherals interface 416. Moreover, the memory controller 412, the one or more processors 414, and/or the peripherals interface 416 may be separate components or may be integrated, such as on one or more integrated circuits. Note that the various components in the portable device 400 may be electrically coupled by one or more signal lines and/or communication buses.

Peripherals interface 416 may be electrically coupled to: an optional sensor 460 (such as CMOS or CCD image sensor), one or more RF circuits 418, one or more audio circuits 422, and/or an input/output (I/O) subsystem 428. These audio circuits 422 may be electrically coupled to a speaker 424 and a microphone 426. Note that the portable device 400 may support voice recognition and/or voice replication.

Moreover, the RF circuits 418 may be electrically coupled to one or more antennas 420 and may allow communication with one or more additional devices, computers and/or servers using a wireless network. Consequently, in some embodiments portable device 400 supports one or more communication protocols, including: code division multiple access (CDMA), global system for mobile communications (GSM), Enhanced Data GSM Environment (EDGE), Wi-Fi (such as IEEE 802.11a, IEEE 802.11b, IEEE 802.11g, and/or IEEE 802.11n), Bluetooth, Wi-MAX, a protocol for email, instant messaging, a simple message system (SMS), and/or any other suitable communication protocol (including communication protocols not yet developed as of the filing date of this document). In an exemplary embodiment, the portable device 400 is, at least in part, a cellular telephone.

In some embodiments, I/O subsystem 428 includes a touch-screen controller 430 and/or other input controller(s) 432. This touch-screen controller may be electrically coupled to a touch-sensitive screen 434. Moreover, the touch-sensitive screen 434 and the touch-screen controller 430 may detect contact and any movement or break thereof using any of a plurality of touch-sensitivity technologies, including but not limited to: capacitive, resistive, infrared, and/or surface acoustic wave technologies, as well as other proximity sensor arrays or other elements for determining one or more points of contact with the touch-sensitive screen 434. In an exemplary embodiment, the touch-sensitive screen 434 has a resolution in excess of 100 dpi, such as approximately 168 dpi.

Note that the other input controller(s) 432 may be electrically coupled to other input/control devices 436, such as: one or more physical buttons, a keyboard, an infrared port, a USB port, and/or a pointer device (such as a mouse). Moreover, the one or more physical buttons may include an up/down button for volume control of the speaker 424 and/or the microphone 426.

In some embodiments, the one or more physical buttons include a push button. By quickly pressing the push button, a user of the portable device 400 may disengage locking of the touch-sensitive screen 434. Alternatively, by pressing the push button for a longer time interval, the user may turn power to the portable device 400 on or off. Moreover, the touch-sensitive screen 434 may be used to implement virtual or soft buttons and/or a keyboard. Note that the user may be able to customize a functionality of one or more of the virtual and/or physical buttons.

In some embodiments, the portable device 400 includes circuits for supporting a location determining capability, such as that provided by the global positioning system (GPS). Moreover, the portable device 400 may be used to play back recorded music, such as one or more files, including MP3 files or AAC files. Consequently, in some embodiments the portable device 400 includes the functionality of an MP3 player, such as an iPod (trademark of Apple, Inc.). Therefore, the portable device 400 may include a connector that is compatible with the iPod™.

Memory controller 412 may be electrically coupled to memory 410. Memory 410 may include high-speed random access memory and/or non-volatile memory, such as: one or more magnetic disk storage devices, one or more optical storage devices, and/or FLASH memory. Memory 410 may store an operating system 438, such as: Darwin, RTXC, LINUX, UNIX, OS X, Windows, and/or an embedded operating system such as VxWorks. This operating system may include procedures (or sets of instructions) for handling basic system services and for performing hardware-dependent tasks. Moreover, memory 410 may also store communication procedures (or sets of instructions) in a communication module 440. These communication procedures may be used for communicating with one or more additional devices, one or more computers and/or one or more servers.

Memory 410 may include a touch-screen module 442 (or a set of instructions), a decoder module 444 (or a set of instructions), event module 446 (or a set of instructions), and/or a notification module 448 (or a set of instructions). Touch-screen module 442 may provide graphics associated with the virtual buttons and/or keyboard. Moreover, the decoder module 444 may receive encoded data 452 to produce decoded data 454, which is consumed by one or more media applications 450.

In some embodiments, event module 446 may detect and/or generate one or more event tokens (each of which corresponds to an event). These event tokens may be stored with metadata 456 associated with the encoded data 452 and/or the decoded data 454. Moreover, notification module 448 may generate one or more notifications by evaluating the stored event tokens in the metadata 456 based on metadata rules 458. This notification(s) may be used to synchronize different data streams, such as a data stream of decoded audio data sent to speaker 424 and a data stream of decoded video data sent to touch-sensitive screen 434.

Note that each of the above-identified modules and applications corresponds to a set of instructions for performing one or more functions described above. These modules (e.g., sets of instructions) need not be implemented as separate software programs, procedures or modules. Consequently, the various modules and sub-modules may be rearranged and/or combined. Moreover, memory 410 may include additional modules and/or sub-modules, or fewer modules and/or sub-modules. Therefore, memory 410 may include a subset or a superset of the above-identified modules and/or sub-modules.

Moreover, instructions in the various modules in the memory 410 may be implemented in a high-level procedural language, an object-oriented programming language, and/or in an assembly or machine language. The programming language may be compiled or interpreted, e.g., configurable or configured to be executed by the one or more processing units 414. Consequently, the instructions may include high-level code in a program module and/or low-level code, which is executed by the processor(s) 414 in the portable device 400. Note that various functions of the device 400 may be implemented in hardware and/or in software, including in one or more signal processing and/or application-specific integrated circuits.

Figure 5:
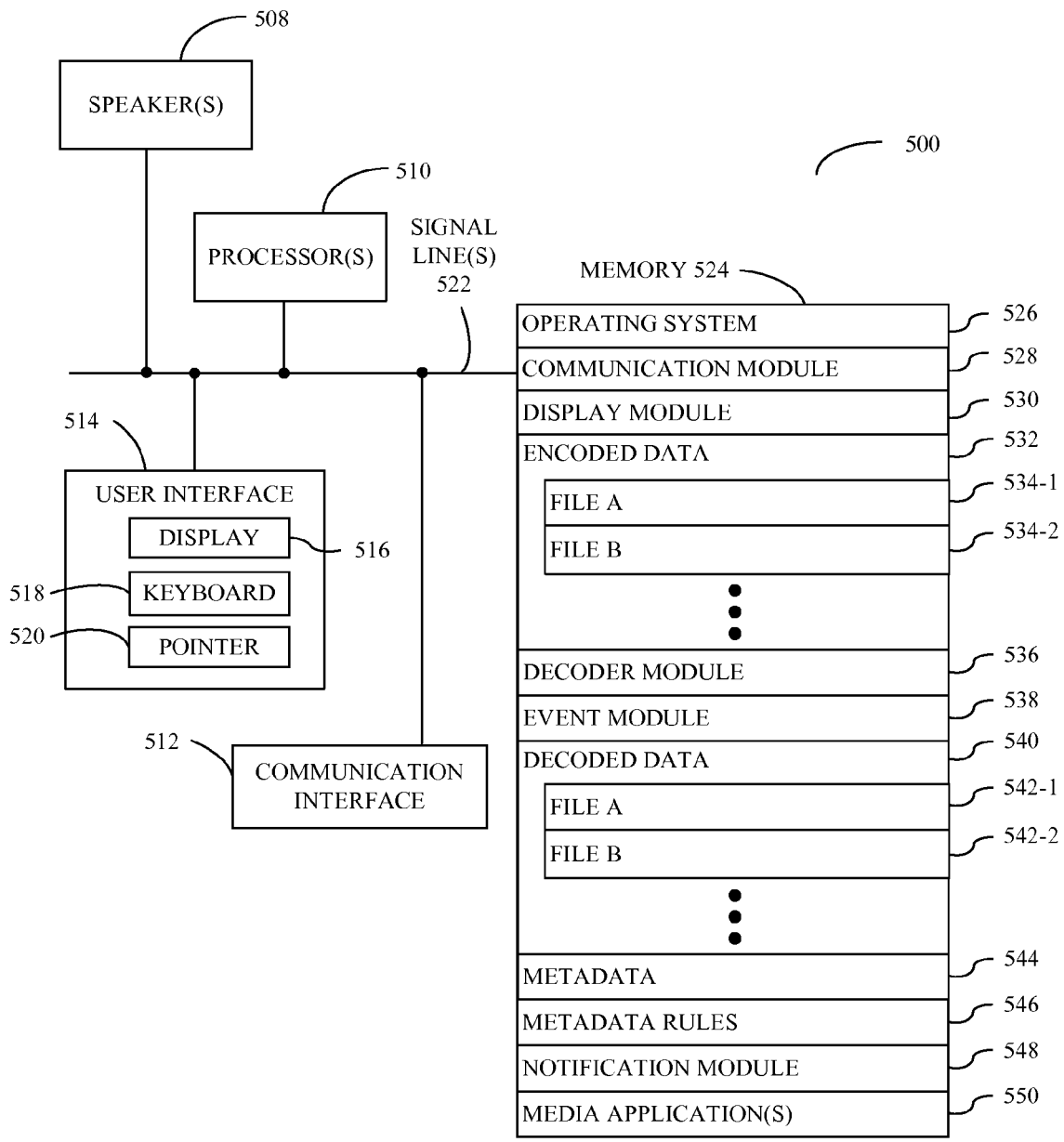
FIG. 5 is a block diagram illustrating a computer system in accordance with an embodiment of the present invention.

FIG. 5 presents a block diagram illustrating an embodiment of a computer system 500. Computer system 500 can include: one or more processors 510, a communication interface 512, a user interface 514, speakers 508, and/or one or more signal lines 522 electrically coupling these components together. Note that the one or more processing units 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in the computer system 500 may include volatile memory and/or non-volatile memory. More specifically, memory 524 may include: ROM, RAM, EPROM, EEPROM, FLASH, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store communication procedures (or a set of instructions) in a communication module 528. These communication procedures may be used for communicating with one or more computers and/or servers, including computers and/or servers that are remotely located with respect to the computer system 500.

Memory 524 may include multiple program modules (or a set of instructions), including: display module 530 (or a set of instructions), decoder module 536 (or a set of instructions), event module 538 (or a set of instructions), and/or notification module 548 (or a set of instructions). Display module 530 may provide graphics for display on display 516. Moreover, the decoder module 536 may receive encoded data 532 (such as file A 534-1 and/or file B 534-2) and may produce decoded data 540 (such as file A 542-1 and/or file B 542-2), which is consumed by one or more media applications 550.

In some embodiments, event module 538 may detect and/or generate one or more event tokens (each of which corresponds to an event). These event tokens may be stored with metadata 544 associated with the encoded data 532 and/or the decoded data 540. Moreover, notification module 548 may generate one or more notifications by evaluating the stored event tokens in the metadata 544 based on metadata rules 546. This notification(s) may be used to synchronize different data streams, such as a data stream of decoded audio data sent to speakers 508 and a data stream of decoded video data sent to display 516.

Instructions in the various modules in the memory 524 may be implemented in a high-level procedural language, an object-oriented programming language, and/or in an assembly or machine language. The programming language may be compiled or interpreted, e.g., configurable or configured to be executed by the one or more processing units 510. Consequently, the instructions may include high-level code in a program module and/or low-level code, which is executed by the processor 510 in the computer system 500.

Although the computer system 500 is illustrated as having a number of discrete components, FIG. 5 is intended to provide a functional description of the various features that may be present in the computer system 500 rather than a structural schematic of the embodiments described herein. In practice, and as recognized by those of ordinary skill in the art, the functions of the computer system 500 may be distributed over a large number of servers or computers, with various groups of the servers or computers performing particular subsets of the functions. In some embodiments, some or all of the functionality of the computer system 500 may be implemented in one or more application-specific integrated circuits (ASICs) and/or one or more digital signal processors (DSPs).

Computer system 500 may include fewer components or additional components. Moreover, two or more components can be combined into a single component and/or a position of one or more components can be changed. In some embodiments the functionality of the computer system 500 may be implemented more in hardware and less in software, or less in hardware and more in software, as is known in the art.

Figure 6:
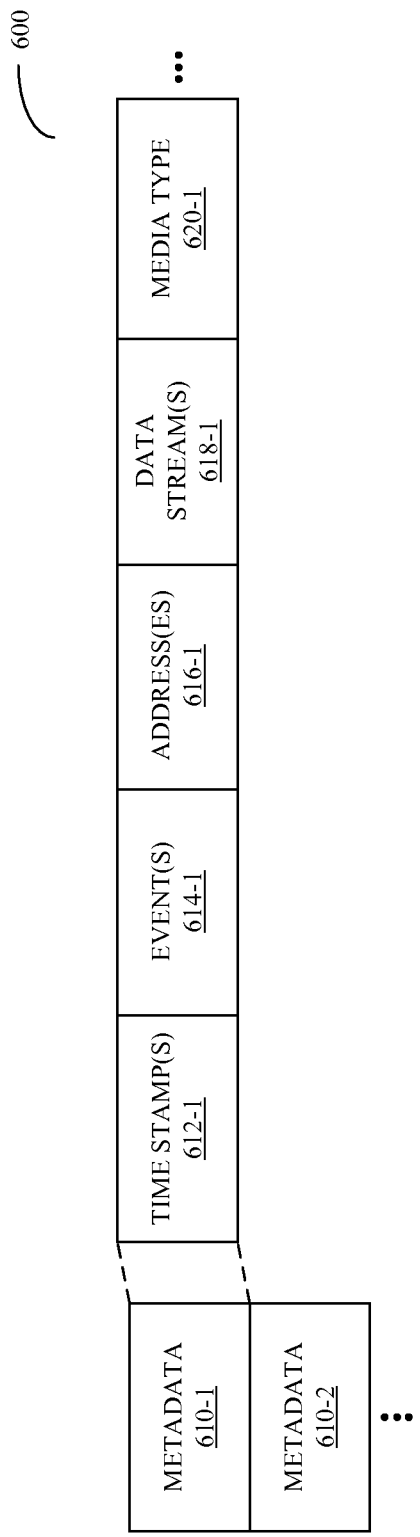
FIG. 6 is a block diagram illustrating a data structure in accordance with an embodiment of the present invention.

Data structures that may be used in the portable device 400 (FIG. 4) and/or the computer system 500 in accordance with embodiments of the invention are now described. FIG. 6 presents a block diagram illustrating an embodiment of a data structure 600. This data structure may include metadata 610, which may be used to synchronize different data streams. A given instance of the metadata, such as metadata 610-1, may include: one or more time stamps 612-1, one or more events 614-1, one or more addresses 616-1 (such as a memory address), portions of one or more data streams 618-1 with which the metadata is associated, and/or a media type 620-1.

Note that in some embodiments of the data structure 600 there may be fewer or additional components. Moreover, two or more components can be combined into a single component and/or a position of one or more components can be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for synchronizing data streams, comprising:
receiving a first data stream having a first data type;
performing a sequence of decoding operations on at least a portion of the first data stream, the decoding operations performed at variable processing rates determined at least in part by operating state of a device that performs the decoding operations, wherein performing the sequence of decoding operations involves generating metadata entries associated with the portion of the first data stream, wherein each metadata entry is generated in response to an occurrence of a decoding event during the performance of the sequence of decoding operations, each metadata entry including a time stamp indicating a time of the occurrence, a data-stream identifier indicating the portion of the first data stream that was decoded during the occurrence, and event information describing the respective decoding event; and
storing each metadata entry; and
providing a notification based on the stored metadata, the notification including information by which the decoded first data stream is synchronized with a second data stream having a second data type.

2. The method of claim 1, wherein the first data stream includes initial metadata.

3. The method of claim 1, wherein the first data stream includes audio and the second data stream includes video corresponding to the audio.

4. The method of claim 1, wherein the first data stream includes data associated with a first type of media and the second data stream includes data associated with a second type of media.

5. The method of claim 1, wherein the sequence of operations includes decoding audio data.

6. The method of claim 1, wherein the stored metadata indicates where the portion of the first data stream is located with reference to the sequence of operations.

7. The method of claim 1, further comprising phase shifting the notification by a time interval, the phase shift being positive or negative.

8. The method of claim 1, wherein the data-stream information associated with at least the portion of the first data stream includes an address of a memory location where the at least the portion of the first data stream is stored.

9. The method of claim 1, further comprising:
evaluating multiple decoding events in the stored metadata using pre-defined rules that prioritize the decoding events; and
generating the notification using stored metadata for which an associated decoding event is evaluated as being of highest priority.

10. The method of claim 1, wherein the notification is provided based on a resizing of a memory allocation associated with at least one operation in the sequence of operations.

11. The method of claim 1, wherein at least one of the decoding events occurs when the associated portion of the first data stream is consumed at an output at the end of the sequence of operations.

12. The method of claim 1, wherein at least one of the decoding events occurs upon completion of a given decoding operation in the sequence of decoding operations.

13. The method of claim 1, wherein at least one of the decoding events occurs upon detection of an end of the first data stream.

14. The method of claim 1, wherein at least one of the decoding events occurs in response to a time-scale modification affecting at least one decoding operation in the sequence of decoding operations, the time-scale modification occurring during the performing of the sequence of decoding operations.

15. The method of claim 1, wherein at least one of the decoding events occurs upon a change in current media playback time, the change occurring during the performing of the sequence of decoding operations.

16. The method of claim 15, wherein the change includes fast forwarding, rewinding or seeking.

17. The method of claim 1, wherein at least one of the decoding events occurs upon changing an active audio-output device during the performing of the sequence of decoding operations.

18. The method of claim 1, wherein at least one of the decoding events occurs upon completion of the sequence of decoding operations.

19. The method of claim 1, wherein at least one of the decoding events occurs in response to an error associated with the first data stream or with at least one operation in the sequence of decoding operations.

20. The method of claim 1, wherein at least one of the metadata entries is generated in response to an internal event associated with at least one decoding operation in the sequence of decoding operations or an external event associated with an application that consumes processed first data output from the sequence of decoding operations.

21. The method of claim 1, wherein the notification is provided based on a presence of a given decoding event in a subset of the decoding events in the stored metadata.

22. A computer program product for use in conjunction with a computer system, the computer program product comprising a computer-readable storage medium and a computer-program mechanism embedded therein for synchronizing data streams, the computer-program mechanism including:
instructions for receiving a first data stream having a first data type;
instructions for performing a sequence of decoding operations on at least a portion of the first data stream, the decoding operations performed at variable processing rates determined at least in part by operating state of a device that performs the decoding operations, wherein performing the sequence of decoding operations involves generating metadata entries associated with the portion of the first data stream, wherein each metadata entry is generated in response to an occurrence of a decoding event during the performance of the sequence of decoding operations, each metadata entry including a time stamp indicating a time of the occurrence, a data-stream identifier indicating the portion of the first data stream that was decoded during the occurrence, and event information describing the respective decoding event;
instructions for storing each metadata entry; and instructions for providing a notification based on the stored metadata, the notification including information by which the decoded first data stream is synchronized with a second data stream having a second data type.

23. A computer system to synchronize data streams, comprising:

a processor;

memory; and a program module, wherein the program module is stored in the memory and configurable to be executed by the processor, the program module including:
instructions for receiving a first data stream having a first data type,
instructions for performing a sequence of decoding operations on at least a portion of the first data stream, the decoding operations performed at variable processing rates determined at least in part by operating state of the processor as it performs the decoding operations, wherein performing the sequence of decoding operations involves generating metadata entries associated with the portion of the first data stream, wherein each metadata entry is generated in response to an occurrence of a decoding event during the performance of the sequence of decoding operations, each metadata entry including a time stamp indicating a time of the occurrence, a data-stream identifier indicating the portion of the first data stream that was decoded during the occurrence, and event information describing the respective decoding event;
instructions for storing each metadata entry; and
instructions for providing a notification based on the stored metadata, the notification including information by which the decoded first data stream is synchronized with a second data stream having a second data type.

24. An integrated circuit, comprising:

an input interface configured to receive a first data stream having a first data type;

an operation circuit electrically coupled to the input interface, the operation circuit configured to receive at least a portion of the first data stream and to perform a sequence of decoding operations on at least the portion of the first data stream, the decoding operations performed at variable processing rates determined at least in part by operating state of the operation circuit as it performs the decoding operations, wherein when performing the sequence of decoding operations, the operation circuit is configured to generate metadata entries associated with the portion of the first data stream, wherein each metadata entry is generated in response to an occurrence of a decoding event during the performance of the sequence of decoding operations, each metadata entry including a time stamp indicating a time of the occurrence, a data-stream identifier indicating the portion of the first data stream that was decoded during the occurrence, and event information describing the respective decoding event;

an event circuit electrically coupled to the operation circuit and a memory buffer, the event circuit configured to store the metadata entries in the memory buffer;

a notification circuit electrically coupled to the memory buffer, the notification circuit configured to provide a notification based on the stored metadata, the notification including information by which the decoded first data stream is synchronized with a second data stream having a second data type; and an output interface electrically coupled to the operation circuit and the notification circuit, the output interface configured to provide processed data output by the operation circuit and the notification.

25. A method for synchronizing data streams, comprising:

receiving a first data stream and a second data stream;

performing a sequence of decoding operations on at least a portion of the first data stream, the decoding operations performed at variable processing rates determined at least in part by operating state of a device that performs the decoding operations, in response to an occurrence of a decoding event during the performance of the decoding operations, generating at the receiver a metadata entry for the decoding event that includes temporal information indicating a time of the occurrence, a data stream identifier indicating the portion of the first data stream that was decoded during the occurrence, and event information describing the respective decoding event; and using the metadata entry to synchronize the first data stream with the second data stream after the first and second data streams have been decoded.

26. A system, comprising:

a first memory configured to receive a first data stream having a first data type;

an operation circuit electrically coupled to the first memory, the operation circuit configured to receive at least a portion of the first data stream and to perform a sequence of decoding operations on at least the portion of the first data stream, the decoding operations performed at variable processing rates determined at least in part by operating state of the operation circuit as it performs the decoding operations, wherein when performing the sequence of decoding operations, the operation circuit is configured to generate metadata entries associated with the portion of the first data stream, wherein each metadata entry is generated in response to an occurrence of a decoding event during the performance of the sequence of decoding operations, each metadata entry including a time stamp indicating a time of the occurrence, a data-stream identifier indicating the portion of the first data stream that was decoded during the occurrence, and event information describing the respective decoding event;

a second memory configured to receive processed data output by the operation circuit;

an event circuit electrically coupled to the operation circuit and the second memory, the event circuit configured to store the metadata entries in the second memory; and a notification circuit electrically coupled to the second memory, the notification circuit configured to provide a notification based on the stored metadata, the notification including information by which the decoded first data stream is synchronized with a second data stream having a second data type.

* * * * *